July 18, 1933.  H. LAMBERT  1,918,918

FOOT PEDAL ATTACHMENT

Filed Dec. 10, 1931  2 Sheets-Sheet 1

INVENTOR
HERBERT LAMBERT
BY
ATTORNEY

July 18, 1933.  H. LAMBERT  1,918,918
FOOT PEDAL ATTACHMENT
Filed Dec. 10, 1931    2 Sheets-Sheet 2
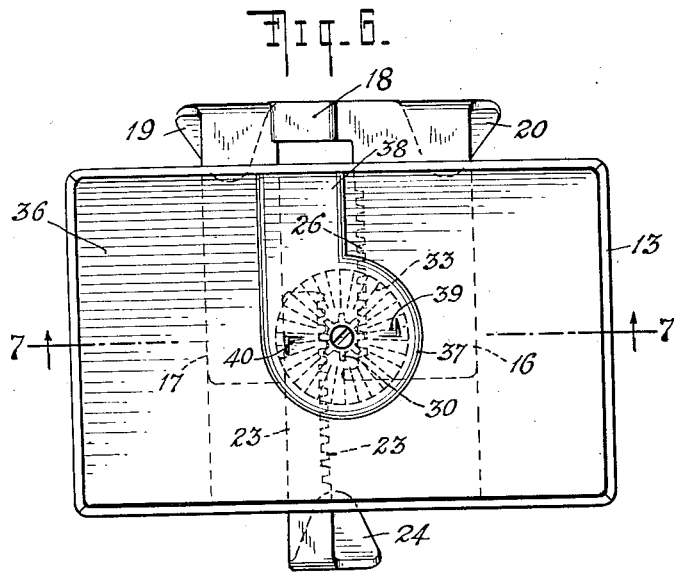
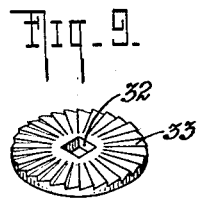
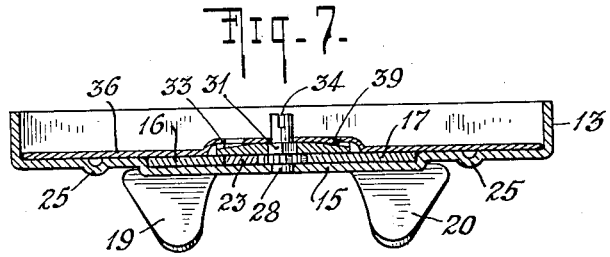
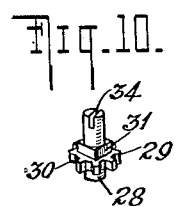
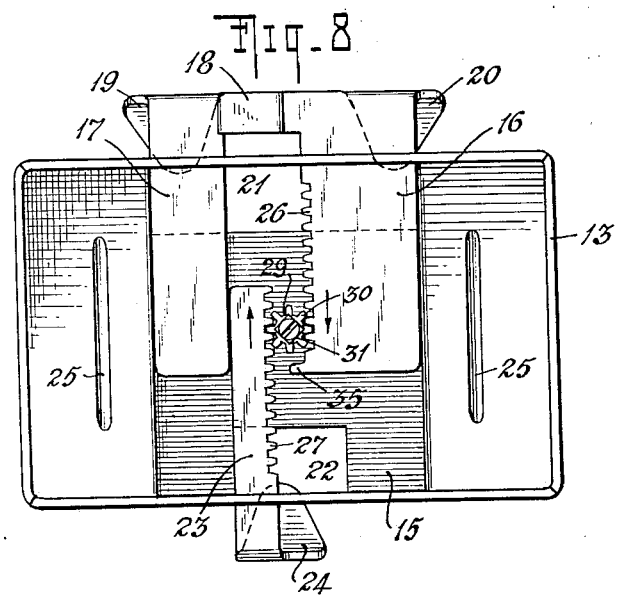
INVENTOR
HERBERT LAMBERT
BY
ATTORNEY Patented July 18, 1933

1,918,918

UNITED STATES PATENT OFFICE

HERBERT LAMBERT, OF BROOKLYN, NEW YORK, ASSIGNOR TO KASTAR SPECIALTY MFG. CO., OF NEW YORK, N. Y., A CORPORATION OF NEW YORK

FOOT PEDAL ATTACHMENT

Application filed December 10, 1931. Serial No. 580,006.

My invention relates to a foot pedal attachment and more particularly to a pedal pad supporting device capable of adjustment, adapting it for application to foot pedals of any size, configuration, or construction. While my novel adjustable pedal pad and support may be applied to a pedal tread of any apparatus having a foot pedal, its most extensive use is indicated in an automotive vehicle and more particularly in connection with the clutch and brake pedal devices thereof.

An object of my invention is to provide a foot pedal attachment to receive a pad, for instance, of rubber, the device being constructed so that it may be applied to a pedal tread of any size. The devices of the prior art are capable of attachment to a pedal tread of a particular size, for instance, the tread of the pedal of the clutch or brake of a particular make of automotive vehicle. For this reason therefore, if the pad of a clutch or brake pedal of a particular make of car is worn, so that it is necessary to replace the same with a new pad, the owner of the car is required to purchase a pedal attachment or a pedal pad which has been expressly manufactured for the particular make of car. He is thus obliged to order the pedal attachment from a dealer supplying accessories for the particular make of car and once he has bought such attachment he can attach it only to the particular foot pedal for which it has been designed.

My invention contemplates the provision of a foot pedal attachment comprising a structure having movable clamping jaws which may be applied to the foot pedal tread for the purpose of securing the device thereto, the movable clamping jaws making possible the attachment of the foot pedal device to a tread of any size, configuration or construction. My invention resides more particularly in the construction of my foot pedal pad device and in the various features thereof adapting it for adjustment to fit the foot pedal tread of any ordinary motor vehicle or machine structure.

Figure 1:
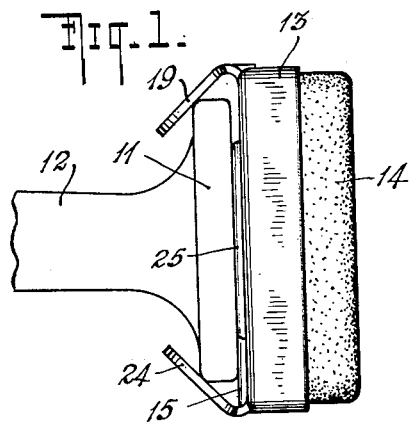
Figure 2:
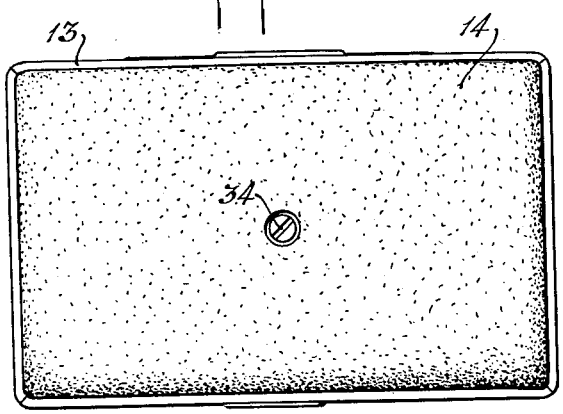
Figure 3:
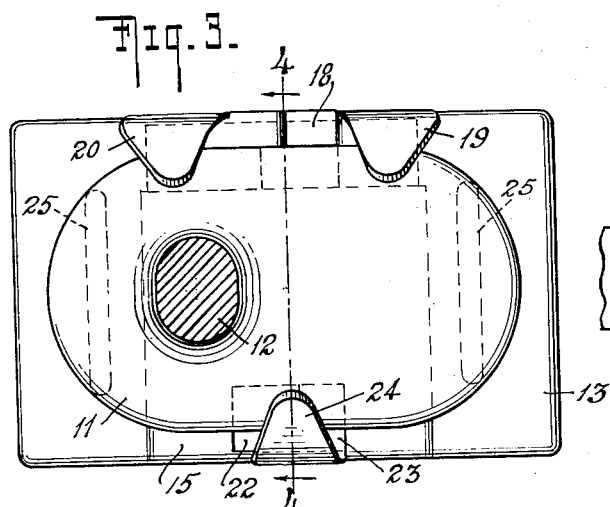
Figure 4:
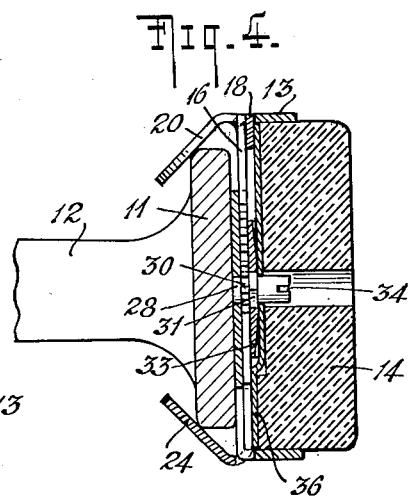
Figure 5:
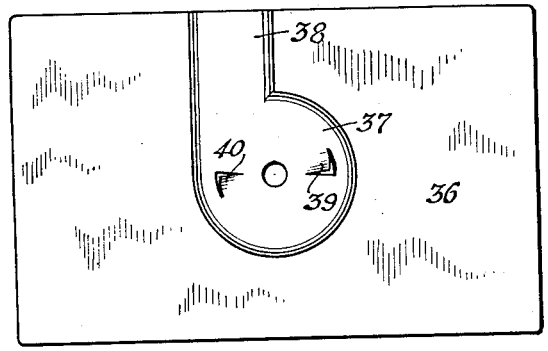

More specific objects of my invention will be apparent from the description of my device when taken in connection with the accompanying drawings in which a specific embodiment of my invention by way of illustration rather than by way of limitation is shown. In such drawings, Fig. 1 is a side view of my novel foot pedal pad supporting structure showing the manner of its attachment to the foot pedal tread; Fig. 2 is a plan view of my device showing the rubber pad attached thereto and the screw by the turning of which the attachment of the device to the pedal tread is accomplished; Fig. 3 is a bottom plan view showing the device attached to the clutch pedal device of an automotive vehicle with the stem of the clutch pedal in section; Fig. 4 is a section on the line 4—4 of Fig. 3; Fig. 5 is a plan view of the cover plate to be inserted into the casing of my device; Fig. 6 is a plan view of my foot pedal attachment with the clamping jaws thereof in extended position before the application of the attachment to the foot pedal tread; Fig. 7 is a section along line 7—7 of Fig. 6; Fig. 8 is a plan view similar to Fig. 6 with the cover plate removed; Fig. 9 shows the ratchet disc forming one of the elements of my inventive structure; and Fig. 10 shows a spindle on which the ratchet disc of Fig. 9 is mounted and by means of which such ratchet disc is turned to move the clamping jaws.

Referring more specifically to the drawings, in which similar reference characters identify similar parts in the several views, 11 is the tread provided at the end of a stem 12 of a clutch or brake mechanism, for instance, of an automotive vehicle, to which my novel pedal pad support is adapted to be attached. The tread 11 may be either of rectangular or oval construction, my attachment being equally applicable to either of these two types of foot pedal treads. In Fig. 3 I have shown my pedal pad attached to the clutch pedal which is usually to the left of the brake pedal when viewed from the operator's seat, the stem 12 of the clutch pedal being somewhat to the right of the center line of the pedal tread. The brake pedal and its stem are usually located immediately to the right of the clutch pedal so that the stem of such brake pedal would be to the right of the center line of the tread, when viewed from the driver's seat. It is for this reason that Fig. 3 shows the stem 12 to the left of the vertical center line of the foot pedal tread.

My foot pedal pad attachment comprises a casing 13 of pressed steel or other suitable material of such depth that it will accommodate the elements hereinafter to be described as well as form a seat for the cushioning pad 14 of the usual construction and material, for instance, rubber, the pad being made either of a configuration to be confined within the peripheral limits of the metallic casing 13 or to be attached thereto in any well-known manner, for instance, so that it will extend over and beyond the peripheral edges of such casing. The casing 13 has its horizontal surface depressed as indicated at 15 in Fig. 8 to accommodate the elements 16 and 17 connected by a bridge portion 18, the jaw members 19 and 20 depending from the elements 16 and 17 which pass beneath the side frames of the casing 13. The depressed horizontal face of the casing 13 has, on the side on which the elements 16 and 17 enter the casing, a slot 21 and on the side opposite therefrom a slot 22 over which rides the element 23 on the end of which is provided the clamping jaw 24, the element 23 passing through the side frame of the casing 13. The end portion of the element 23 is adapted to pass beneath the bridge 18 when the clamping jaws are in their clamping position as hereinafter described. The casing 13 is provided with reinforcing ribs 25, 25 which serve at the same time as supports for the structure when it is mounted on a pedal tread.

As shown particularly in Fig. 8, the element 16 on its side facing the center of the mechanism is provided with teeth 26 comprising a rack, and the element 17 on its side facing the center of the mechanism provides a smooth raceway against which is adapted to slide the outer face of the element 23. The opposite side of the element 23, i. e. the side facing the center of the mechanism, is provided with teeth 27 forming a rack. Through the center of the casing 13 is passed the end of a spindle 28 illustrated in Fig. 10. Integral with said spindle is a pinion 29 having teeth 30 constructed and proportioned to engage the teeth 26 and 27 of the elements 16 and 23 respectively. Also integral with the spindle 28 is a square hub 31 adapted to enter into engagement with the square aperture 32 of the ratchet disc 33, when such ratchet disc is passed over the spindle 28 with the ratchet face thereof extending upwardly. The end of the spindle 28 protruding from the ratchet disc 33 is provided with a slot 34 adapted to receive the end of a screw-driver or similar tool whereby the spindle 28 may be turned, thereby revolving the pinion 29 in a clockwise direction so that the racks formed by the teeth 26 and 27 will be moved in the direction of the arrows in Fig. 8. The movement of such racks will cause the movement of the elements 16 and 17 towards the element 23 and therefore the movement of the clamping jaws 19 and 20, toward the jaw 24. The turning of the pinion 29 and therefore the movement of the elements 16, 17 and 23 will be continued by the turning of the screw-driver inserted into the slot 34 until the jaws 19, 20, and 24 have clamped firmly between them the pedal tread 11. The provision of the heel 35 at the end of the rack of element 16 limits the movement of the jaws 19 and 20 from the jaw 24 so that before the application of my foot pedal pad attachment to the pedal tread, the elements 16, 17, and 23 would be retained in their positions within the casing 13.

The cover plate 36 of stamped metal is of an outline substantially the same as that of the casing 13 so that when such cover plate is inserted in such casing, it will serve to cover and protect the mechanism just described. The cover plate 36 is provided at its center with a raised portion 37 to accommodate the ratchet disc 33, the raised portion of the cover plate extending at 38 to the edge of the casing through which the elements 16 and 17 enter such casing so as to provide a housing for the bridge portion 18 when the latter is drawn within the casing as the device is clamped on the pedal tread.

The raised portion 37 of the cover plate has cut therein tongues 39, 40 which are depressed so as to protrude below said cover plate when the same is inserted within the casing 13 and to engage the corrugations of the ratchet disc 33 so as to limit the revolution thereof after the pedal pad has been attached to the tread by the clamping jaws 19, 20, and 24 and to prevent the movement of the elements 16, 17 and 23 away from each other when the device has once been firmly clamped on the pedal tread. The tongues 39, 40 will engage the corrugations of the ratchet disc 33 to prevent the revolution thereof counter-clockwise so that once the pad and its supporting structure have been clamped to the pedal tread, the accidental disengagement thereof from such tread by the loosening of the clamping jaws 19, 20 and 24 will be prevented. Thus, it will be seen that when the end of the screw-driver is inserted into the slot 34 of the spindle 28, such spindle can be revolved only in the direction in which it will be effective to draw the jaw members 19, 20 and 24 toward each other so as to firmly grip the pedal tread between them. Even if the screw-driver were intended to be turned in the wrong, i. e. counter-clockwise, direction, the engagement of the tongues 39, 40 with the corrugations in the surface of the ratchet disc 33 will prevent the revolution of the pinion 29 and therefore the loosening of the clamping jaws.

While I have described a specific embodiment of my invention, it is obvious that various modifications therein, particularly in the arrangement of the parts, and their configuration, may be made without departing from my invention. For instance, while I have shown the clamping jaws of my device as having a substantially flat clamping surface, it is obvious that the construction of the clamping jaws with arcuate clamping surfaces, to obtain a greater gripping surface when the device is being applied to an oval or similarly arcuate pedal tread, would be within my invention.

I claim:

1. In a pedal attachment, the combination of a casing, a resilient pad secured thereon, a pair of movable members within said casing and adapted to protrude through the opposite sides thereof, jaw elements integral with said members, and means for moving said members simultaneously toward each other for clamping a foot pedal tread between said jaws, one of said movable members comprising a metallic plate having two leg portions connected by a raised bridge portion to clear the second of said movable members when said members are near the limit of their movement toward each other.

2. In a pedal attachment, the combination of a casing, a resilient pad secured thereon, a pair of movable members within said casing and adapted to protrude through the opposite sides thereof, jaw elements integral with said members, and means for moving said members simultaneously toward each other for clamping a foot pedal tread between said jaws, one of said movable members comprising a metallic plate having two leg portions extending transversely into the casing, one of said leg portions being provided on its side facing the center of the casing, with a plurality of teeth forming a rack.

3. In a pedal attachment, the combination of a casing, a resilient pad secured thereon, a pair of movable members within said casing and adapted to protrude through the opposite sides thereof, jaw elements integral with said members, and means for moving said members simultaneously toward each other for clamping a foot pedal tread between said jaws, one of said movable members comprising a metallic plate having two leg portions extending transversely into the casing, one of said leg portions being provided on its side facing the center of the casing with a plurality of teeth forming a rack, and the other of said movable members being provided on its side facing the center of the casing with a plurality of teeth forming a rack.

4. In a pedal attachment, the combination of a casing, a resilient pad secured thereon, a pair of movable members within said casing and adapted to protrude through the opposite sides thereof, jaw elements integral with said members, and means for moving said members simultaneously toward each other for clamping a foot pedal tread between said jaws, one of said movable members comprising a metallic plate having two leg portions extending transversely into the casing, one of said leg portions being provided on its side facing the center of the casing with a plurality of teeth forming a rack, the other of said movable members being provided on its side facing the center of the casing with a plurality of teeth forming a rack, and one of said movable members being provided with a projecting heel at the end of the rack formed by its teeth.

5. In a pedal attachment for supporting a pedal pad, the combination of a casing, a pair of movable members mounted within said casing and projecting through the opposite sides thereof, a clamping jaw on each of said members on the ends thereof protruding from said casing, a plurality of teeth provided on the sides of said movable members facing each other, a spindle mounted substantially in the center of said casing perpendicular to the face thereof and intermediate the sides of the movable members having the teeth thereon, a pinion on said spindle engaging the teeth of said movable members on opposite sides thereof, the end of said spindle being provided with a slot for receiving the end of a screw-driver to impart rotative movement thereto, whereby the movable members may be moved toward each other.

6. In a pedal attachment for supporting a pedal pad, the combination of a casing, a pair of movable members mounted within said casing and projecting through the opposite sides thereof, a clamping jaw on each of said members on the ends thereof protruding from said casing, a plurality of teeth provided on the sides of said movable members facing each other, a spindle mounted substantially in the center of said casing perpendicular to the face thereof and intermediate the sides of the movable members having the teeth thereon, a pinion on said spindle engaging the teeth of said movable members on opposite sides thereof, the end of said spindle being provided with a slot for receiving the end of a screw-driver to impart rotative movement thereto, whereby the movable members may be moved toward each other, a ratchet disc mounted on said spindle having its corrugations face upwardly, and a cover plate inserted within the said casing having a raised portion having cut therefrom a tongue for engagement with the corrugations of said ratchet disc to prevent the revolution thereof in a counter-clockwise direction.

7. In a pedal attachment for supporting a pedal pad, the combination of a casing, a pair of movable members mounted within said casing and projecting through the opposite sides thereof, one of said movable members comprising a metallic plate having two leg portions extending transversely into the casing, a plurality of teeth forming a rack on the side of one of said leg portions facing the center of the casing, a plurality of clamping jaws on the end of said metallic plate protruding from said casing, the other of said movable members being provided on the side thereof facing the center of the casing with a plurality of teeth forming a rack, a clamping jaw on the end of said second movable member protruding from the other side of said casing, a spindle mounted in the center of said casing midway between the movable members, and a pinion formed integrally with said spindle and adapted to engage the teeth of said movable members for moving said members toward and away from each other.

HERBERT LAMBERT.